United States Patent
Thubert et al.

(10) Patent No.: US 9,948,542 B2
(45) Date of Patent: Apr. 17, 2018

(54) FILTERING ON CLASSES AND PARTICULARS OF A PACKET DESTINATION ADDRESS AT LOWER-PROTOCOL LAYERS IN A NETWORKED DEVICE

(71) Applicants: Pascal Thubert, La Colle sur Loup (FR); Shwetha Subray Bhandari, Bangalore (IN)

(72) Inventors: Pascal Thubert, La Colle sur Loup (FR); Shwetha Subray Bhandari, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 612 days.

(21) Appl. No.: 14/155,582

(22) Filed: Jan. 15, 2014

(65) Prior Publication Data
US 2015/0139225 A1  May 21, 2015

(30) Foreign Application Priority Data
Nov. 18, 2013 (IN) .......................... 3360/DEL/2013

(51) Int. Cl.
*H04L 12/18* (2006.01)
*H04L 12/725* (2013.01)
(Continued)

(52) U.S. Cl.
CPC .......... *H04L 45/16* (2013.01); *H04L 12/1886* (2013.01); *H04L 69/22* (2013.01); *H04L 12/185* (2013.01)

(58) Field of Classification Search
CPC ....... H04L 12/18; H04L 45/16; H04L 49/201; H04L 41/0893; H04L 29/12254;
(Continued)

(56) References Cited

U.S. PATENT DOCUMENTS 5,970,069 A * 10/1999 Kumar .................... H04L 69/12
370/401
6,591,304 B1    7/2003 Sitaraman et al.
(Continued)

FOREIGN PATENT DOCUMENTS

GB    2 447 635 A    9/2008
WO    2008/002604 A2    1/2008

OTHER PUBLICATIONS

PCT Invitation to Pay Additional Fees, PCT Application PCT/US2014/060498, ISA/EP, European Patent Office, Netherlands, dated Apr. 29, 2015 (five pages).
(Continued)

*Primary Examiner* — Awet Haile
(74) *Attorney, Agent, or Firm* — The Law Office of Kirk D. Williams (57) ABSTRACT

In one embodiment, a lower protocol layer in a network device filters packets based on a class and a particular of a destination address prior to sending information from the received packet to a higher protocol layer. For example, certain constrained networks include network nodes that do not have the ability to maintain a multicast distribution entry for each multicast address used in the network. By only forwarding on a portion of a multicast address, packets are often delivered to nodes in addition to the actual multicast subscribers. By filtering these incorrectly delivered packets at a lower protocol layer (e.g., layer-2 or layer-3), processing cycles at higher protocol layers are avoided. Additionally in one embodiment, class and particulars are deterministically determined (e.g., using a same hashing function) such that services can be discovered and used by subscribing to a corresponding multicast group.

9 Claims, 10 Drawing Sheets

(51) Int. Cl.
*H04L 12/741* (2013.01)
*H04L 12/761* (2013.01)
*H04L 29/06* (2006.01)

(58) Field of Classification Search
CPC .............. H04L 29/12292; H04L 63/20; H04L 65/1073; H04L 47/00; H04L 12/2889; H04L 47/822; H04L 69/18
See application file for complete search history.

(56) References Cited

U.S. PATENT DOCUMENTS

| | | | |
|---|---|---|---|
| 7,185,081 B1 | 2/2007 | Liao | |
| 7,257,095 B2 | 8/2007 | Liu | |
| 2007/0008967 A1* | 1/2007 | Bressler | H04L 12/189 370/390 |
| 2007/0061433 A1* | 3/2007 | Reynolds | H04L 12/2602 709/223 |
| 2007/0083924 A1 | 4/2007 | Lu | |
| 2010/0214992 A1 | 8/2010 | Hart et al. | |

OTHER PUBLICATIONS

Cheshire and Krochmal, "Multicast DNS," RFC 6762, Feb. 2013, The Internet Society, Reston, VA, USA (seventy pages).

Cheshire and Krochmal, "DNS-Based Service Discovery," draft-cheshire-dnsext-dns-sd-11.txt, Dec. 9, 2011, The Internet Society, Reston, VA, USA (fifty-four pages).

Aboba et al, "Link-Local Multicast Name Resolution (LLMNR)," RFC 4795, Jan. 2007, The Internet Society, Reston, VA, USA (thirty-one pages).

Winter et al, "RPL: IPv6 Routing Protocol for Low-Power and Lossy Networks," RFC 6550, Mar. 2012, The Internet Society, Reston, VA, USA (157 pages).

"Manually Adding DNS-SD Service Discovery Records to an Existing Name Server," available at http://www.dns-sd.org/ServerStaticSetup.html (three pages).

PCT International Search Report and Written Opinion, PCT Application PCT/US2014/060498, ISA/EP, European Patent Office, Netherlands, dated Jul. 7, 2015 (fifteen pages).

"Entry into the European Phase," Nov. 25, 2015, EP Application 14793689.2, European Patent Office, The Hague (fifteen pages).

EP Examination Report (Communication pursuant to Article 94(3) EPC), dated Mar. 21, 2017, EP Application 14793689.2, European Patent Office, Munich, Germany (three pages).

"The First Office Action," English Translation and Original in Chinese including four pages of examined claims in English, State Intellectual Property Office of the People's Republic of China, dated Oct. 30, 2017, Beijing, P. R. China (twenty-six pages total).

\* cited by examiner

FILTERING ON CLASSES AND PARTICULARS OF A PACKET DESTINATION ADDRESS AT LOWER-PROTOCOL LAYERS IN A NETWORKED DEVICE

TECHNICAL FIELD

The present disclosure relates generally to forwarding packets in a communications network, including, but not limited to, a constrained network (e.g., wireless deterministic network).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Deterministic networks rely on a set of predetermined time slots, which define at least a time (and possibly frequency to use—especially in a wireless deterministic network), when each specific node can communicate a packet to a second specific node in the deterministic network. Additionally, network devices in a constrained network (e.g., a low power lossy network or "LLN") do not have the memory or processing capabilities of full size packet switching devices, and often have power constraints based on battery life.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with filtering on classes and particulars of a packet destination address at lower protocol layers in a networked device. As used herein in as a noun, a "particular" refers to an individual or specific subclass (e.g., of a class).

One embodiment includes: receiving, by a network device in a network, a specific packet containing a destination address of the specific packet, with the destination address including a class and a particular and one or more additional values; determining, by a lower-layer protocol of the network device, whether an upper layer protocol of the network device has subscribed to receive information included in a packet specifying the class and the particular in a destination address of the packet; and in response to said determining that the higher-layer protocol has subscribed to receive information included in the specific packet based on the class and particular; forwarding information from the specific packet to the higher-layer protocol.

One embodiment includes: configuring a lower-layer protocol within a particular device in a network to match against a class and a particular contained in a multicast destination address of a received packet to identify whether to send information from the received packet to a higher-layer protocol within the particular device; making the particular device a multicast destination within the network for an identified multicast destination address including the class and the particular; receiving a specific packet sent from a second device in the network, with the destination address of the specific packet including the identified multicast destination address; and in response to determining, by the lower-layer protocol, that the multicast destination address of the specific packet matches the class and the particular, communicating information from the specific packet to the higher-layer protocol.

One embodiment includes: generating a type multicast destination address for coupling to a desired service type, with the type multicast destination address including a specific class corresponding to the desired service type and a specific particular corresponding to all particulars of the desired service type; generating one or more multicast distribution group join packets that are subsequently sent from the network appliance for joining a multicast group corresponding to the type multicast destination address; generating a distinctive multicast destination address for coupling to a desired particular service within the desired service type, with the distinctive multicast destination address including the desired specific class and a distinctive particular corresponding to the desired particular service; and generating one or more multicast distribution group join packets that are subsequently sent from the network appliance for joining a multicast group corresponding to the distinctive multicast destination address.

2. Description

Disclosed are, inter alia, methods, apparatus, computer-storage media, mechanisms, and means associated with filtering on classes and particulars of a packet destination address at lower protocol layers in a networked device. In one embodiment, a lower protocol layer in a network device filters packets based on a class and a particular of a destination address prior to sending information from the received packet to a higher protocol layer. For example, certain constrained networks include network nodes that do not have the ability to maintain a multicast distribution entry for each multicast address used in the network. By only forwarding a portion (not the entirety) of a multicast address, packets are often delivered to the actual multicast subscribers and additionally to other non-subscribing nodes (because of their common portion of the multicast address which is used to forward the packets). By filtering these incorrectly delivered packets at a lower protocol layer (e.g., layer-2 or layer-3), processing cycles at higher protocol layers may be reduced or avoided. Additionally in one embodiment, class and particulars are deterministically determined (e.g., using a same hashing function) such that services can be discovered and used by subscribing to a corresponding multicast group.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a specific embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between specific units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, a reference to a "specific machine" or similar when recited in a method claim for performing steps, refers to a specific machine within the 35 USC § 101 machine statutory class.

As used herein, a "time slot" refers to an elementary communications entity including a period of time for sending or receiving information (e.g., a packet). In the context of a wireless network, a time slot is also typically associated with a frequency, as the information is not only transmitted within a time slot, but also at a frequency (e.g., channel).

Figure 1A:
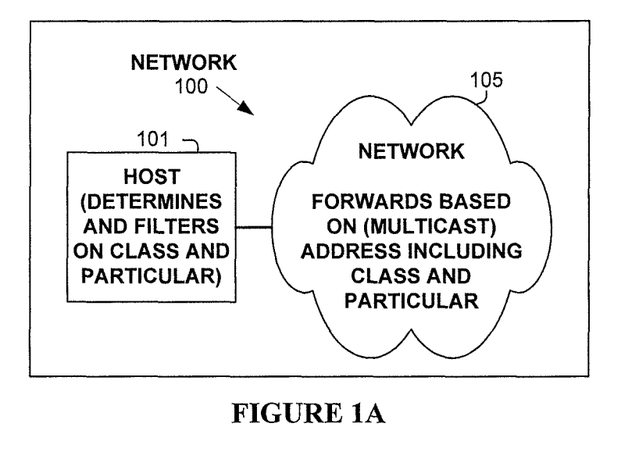
FIG. 1A illustrates a network operating according to one embodiment.

Turning to the figures, FIG. 1A illustrates a network 100 operating according to one embodiment. Host 101 is a networked apparatus (e.g., appliance) such as, but not limited to, a networked computer, mobile or fixed host device, or packet switching device. Network 105 may or may not comprise or include a constrained network (e.g., low power lossy network or "LLN"). Host 101 determines classes and particulars and filters on classes and particulars of a packet destination address at lower protocol layers in host 101. Network 105 communicates packets, including based on destination addresses of packets. These destination addresses may include a class and a particular. For some packets, these destination addresses are multicast destination addresses.

Figure 1B:
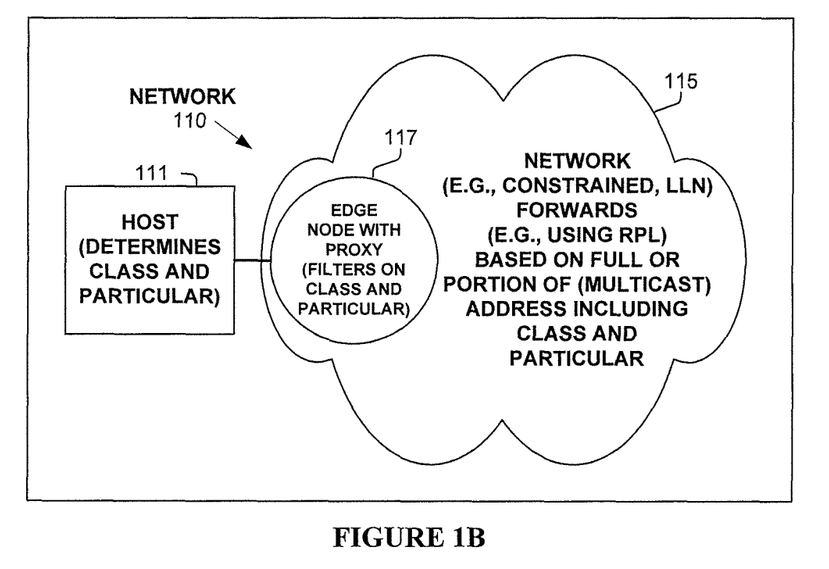
FIG. 1B illustrates a network operating according to one embodiment.

FIG. 1B illustrates a network 110 operating according to one embodiment. Host 111 is a networked apparatus (e.g., appliance) such as, but not limited to, a networked computer, mobile or fixed host device, packet switching device. Network 115 may or may not comprise or include a constrained network (e.g., low power lossy network or "LLN"). FIG. 1B is used to illustrate that a network device such as, but not limited to, edge node 117 may be a proxy for host 101 and filter on classes and particulars of a packet destination address at lower protocol layers in host 101 before a higher protocol layer sends the information to host 111. Network 115 communicates packets, including based on destination addresses of packets. These destination addresses may include a class and a particular. For some packets, these destination addresses are multicast destination addresses.

Figure 1C:
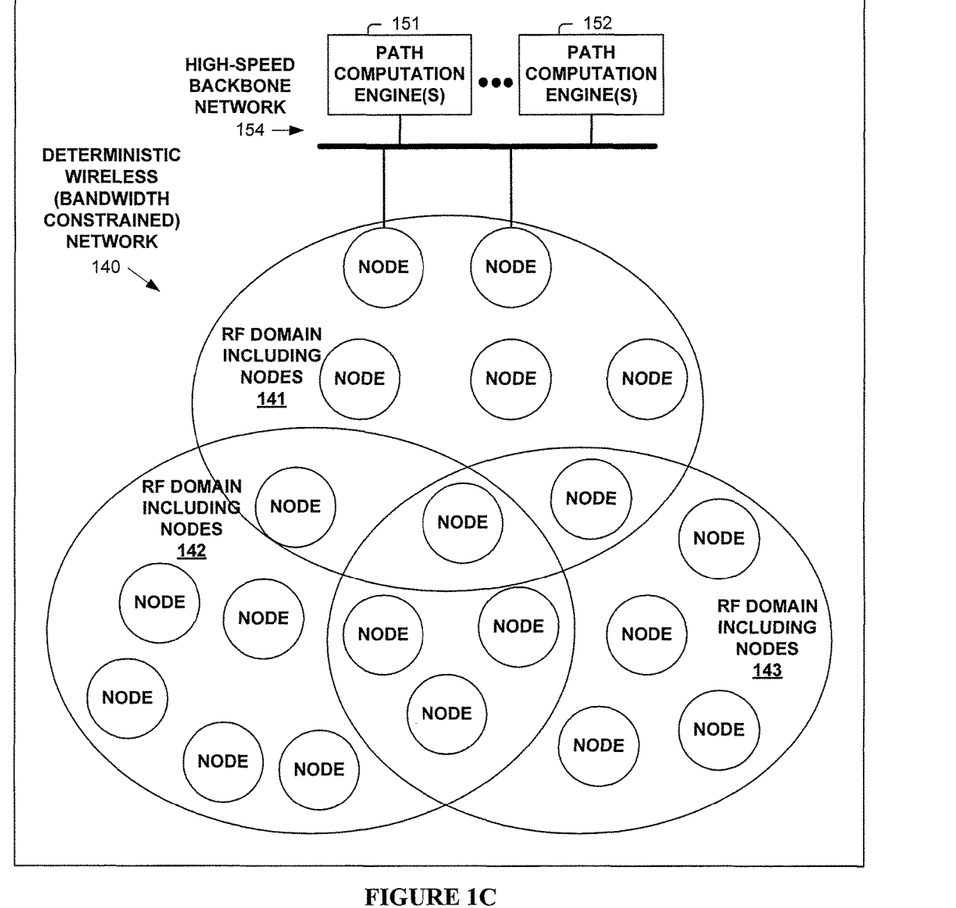
FIG. 1C illustrates a network operating according to one embodiment.

FIG. 1C illustrates network 140 (e.g., deterministic wireless network, which is bandwidth constrained) operating according to one embodiment. As shown, network 140 includes a high-speed (e.g., Ethernet) backbone network 154 including one or more path computation engines 151-152. Deterministic wireless network 140 includes three overlapping different radio frequency (RF) domains 141, 142 and 143, each containing a plurality of nodes as shown in FIG. 1C. Note, typically and not shown, each of these network nodes (e.g., when a node operates as a bridge or router) is connected to a network of devices and/or directly connected to one or more devices. One embodiment uses more or less RF domains and/or nodes.

Figure 1D:
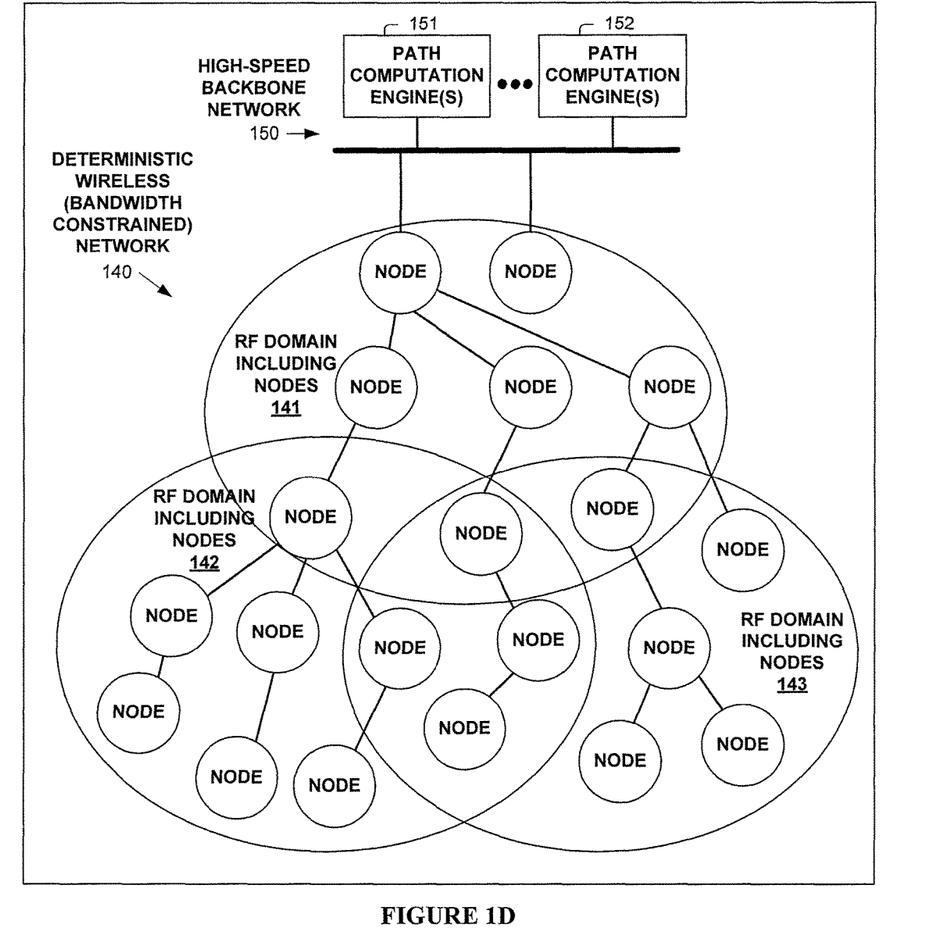
FIG. 1D illustrates a network operating according to one embodiment.

FIG. 1D illustrates the communication links established between nodes in RF domains 141, 142 and 143 to provide access to one or more path computation engines 151-152. In one embodiment, a communications path for transmitting packets between first and second nodes may traverse any set of nodes, and is not limited to one or more of the paths shown in FIG. 1D.

Figure 1E:
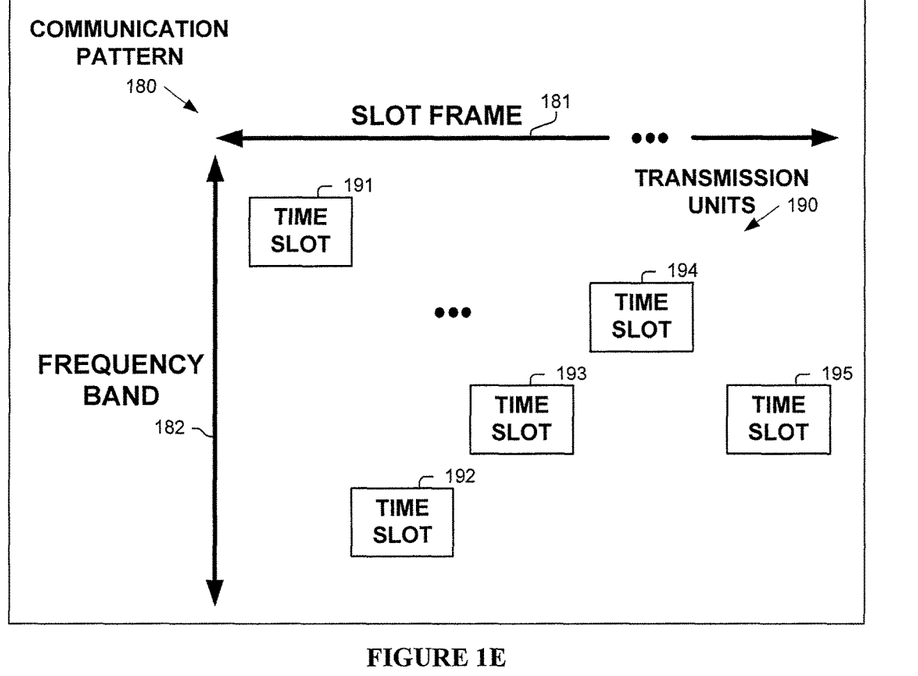
FIG. 1E illustrates a communication pattern operating according to one embodiment.

FIG. 1E illustrates a communication pattern 180 according to one embodiment of a deterministic network. Communication pattern 180 includes time slots 191-195, each of which provide a predetermined time for a sender to transmit a packet and for a receiver to listen to receive the transmitted packet. A slot frame 181 (e.g., a Superframe when repeated typically with channel rotation) is a period of time divided into multiple time slots. Also, in a wireless (or fiber) a second dimension of frequency (182) is associated with each time slot 191-195. In one embodiment, a Superframe 181 is established by one or more path computation engines that define a matrix of n time slots by m frequencies (e.g., channels). One or more of these n-m pairings is referred to herein as a time slot as multiple time slots might be used to send a packet (e.g., to have a predetermined retransmission time for the packet if required).

Figure 2A:
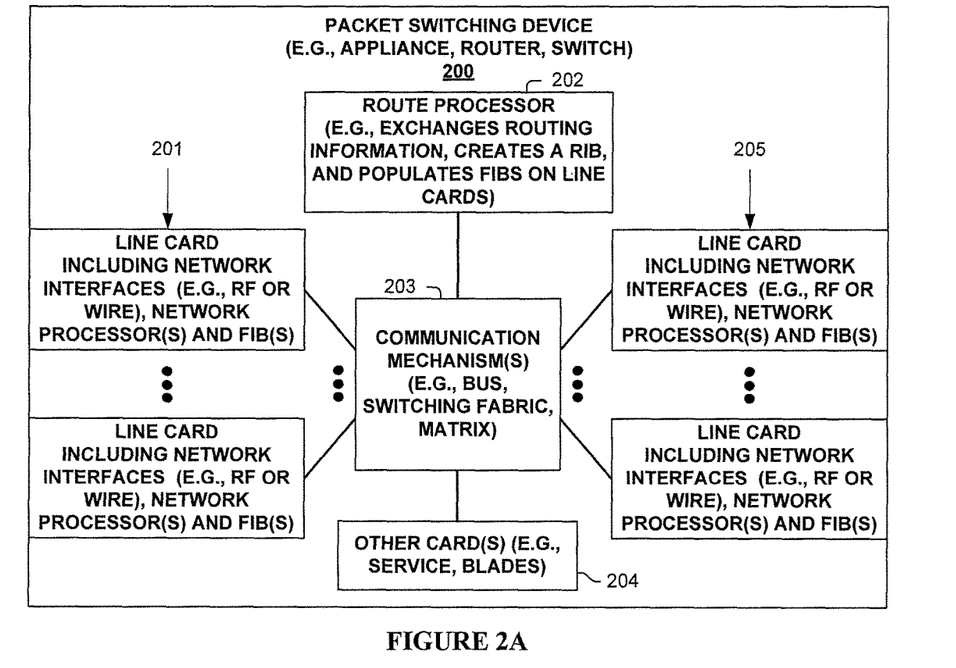
FIG. 2A illustrates a packet switching device according to one embodiment.

One embodiment of a packet switching device 200 (e.g., one example of a network node) is illustrated in FIG. 2A. As shown, packet switching device 200 includes multiple line cards 201 and 205, each with one or more network interfaces for sending and receiving packets over communications links, and with one or more processing elements that are used in one embodiment associated with filtering on classes and particulars of a packet destination address at lower protocol layers in a networked device. Packet switching device 200 also has a control plane with one or more processing elements 202 for managing the control plane and/or control plane processing of packets associated with filtering on classes and particulars of a packet destination address at lower protocol layers in a networked device. Packet switching device 200 also includes other cards 204 (e.g., service cards, blades) which include processing elements that are used in one embodiment to process packets associated with filtering on classes and particulars of a packet destination address at lower protocol layers in a networked device, and some communication mechanism 203 (e.g., bus, switching fabric, matrix) for allowing its different entities 201, 202, 204 and 205 to communicate. In one embodiment, packet switching device 200 has one or more RF interfaces (possibly only one such interface), such as, but not limited to that based on IEEE 802.15.4e.

Figure 2B:
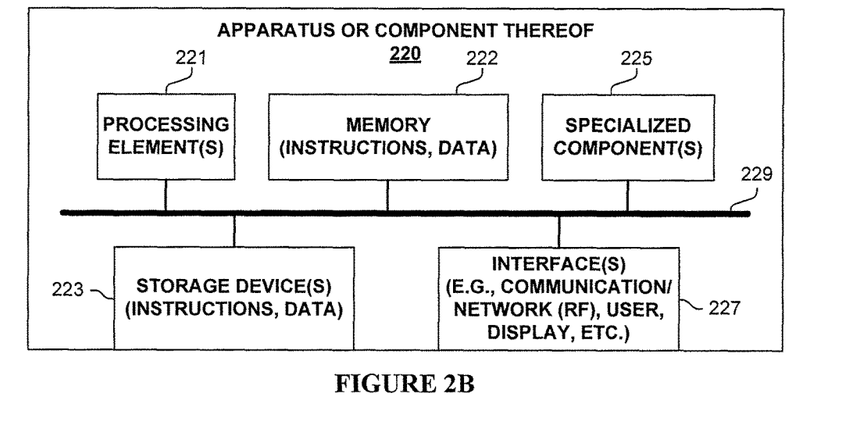
FIG. 2B illustrates an apparatus according to one embodiment.

FIG. 2B is a block diagram of an apparatus 220 (e.g., path computation engine or a network node, or portion thereof) used in one embodiment associated with filtering on classes and particulars of a packet destination address at lower protocol layers in a networked device. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application. In one embodiment, interface 227 is one or more RF interfaces, such as, but not limited to that based on IEEE 802.15.4e.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3A:
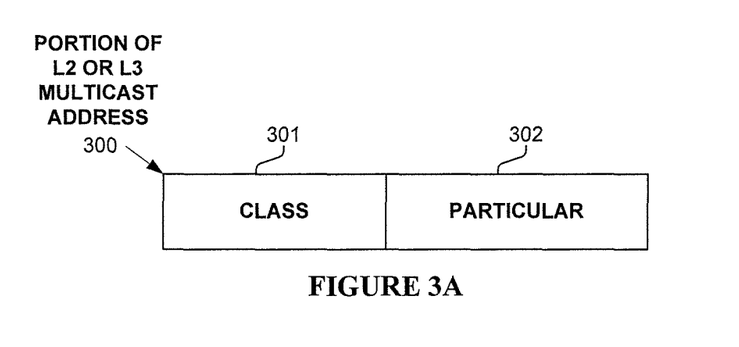
FIG. 3A illustrates a portion of multicast address according to one embodiment.

Illustrated in FIG. 3A is a portion of a layer-2 or layer-3 multicast address, which includes class 301 and particular 302. In one embodiment, class 301 corresponds to a generic group, and particular 302 defines to a specific item in the group, or all specific items of the generic group. For example, in the context of multicast Domain Name System (mDNS), the class 301 may correspond to .local, .home, .cisco.com, etc., while the particular may be to communicate to all subscribers of class 301, or to an individual subscriber. In another context, class 301 may represent a group of printers, and the particular correspond to all printers, a class of printers (e.g., one or more printers of a class such as, but not limited to, HP color printers, or a specific printer (e.g., a specific printer in a specific room).

In one embodiment, class 301 is determined using a hashing function to change one value (e.g., alphanumeric such as .home) into a different value of class 301. Similarly, in one embodiment, particular 302 is determined using a hashing function to change one value (e.g., alphanumeric such as HP color printer-A) into a different value of class 302. By using a same hashing function, each service providing entity and consumer can deterministically produce a same value of class 301 and particular 302.

One embodiment uses class 301 and particular 302 as a portion of a layer-2 (e.g., Ethernet) or layer-3 network address (e.g., Internet Protocol version 4 or 6). For example in one embodiment, an Internet Protocol version 6 (IPv6) address may take the form of FF0x:y::<class 301><particular 302>/64, where x denotes a sufficiently wide scope and y is a value selected to make a valid IPv6 address. In one embodiment, class 301 is a thirty-two bit value and particular 302 is a thirty-two bit value.

In one embodiment, a network device (or its proxy) that is desirous to be a provider or consumer of a service will subscribe to a multicast distribution tree for the multicast address including class 301 and particular 302.

However, especially when a network does not forward packets based on the full length of a destination address, packets may be delivered to non-intended recipients. These packets are filtered at the application layer in one embodiment, but that requires processing at multiple layers in a protocol stack.

Figure 3B:
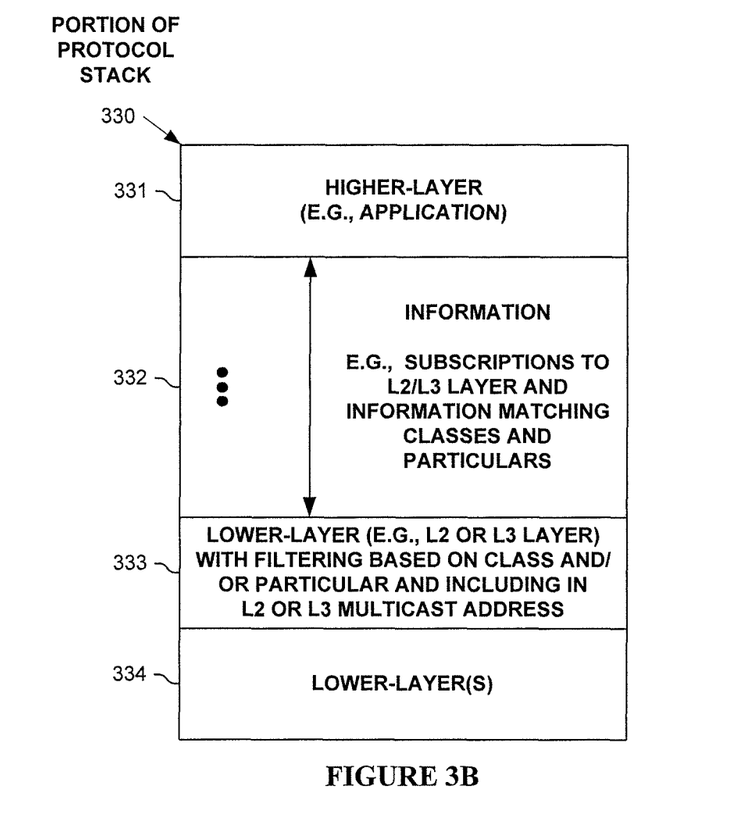
FIG. 3B illustrates a portion of a protocol stack according to one embodiment.

FIG. 3B illustrates processing of a portion of a protocol stack 300 according to one embodiment. Illustrated are higher-layer protocol 331 (e.g., application layer), lower-layer protocol 333 (e.g., Layer-2 or Layer-3 protocol layer), with intermediate protocol layer(s) 332 and lower-layer(s) 334.

In one embodiment, higher protocol layer 331 registers with lower-layer protocol layer 333 classes and particulars thereof for which it would like to receive (or not receive) information from packets received with a matching class and particular. Lower-layer protocol layer 333 performs this filtering and selectively forwards information from a packet whose class and particular in its destination address match one of the subscribed classes/particulars. In one embodiment, exact matching is performed on the class of the destination address of a received packet. In one embodiment, partial matching is performed on the particular of the destination address of a received packet.

In one embodiment, a receiving node may not have enough memory and/or processing capability to maintain an entry in a data structure for every possible class/particular pairing. In one embodiment, partial matching is performed by lower-layer protocol layer 333 on the class and/or particular which allows the number of entries in a matching data structure to be reduced. For example and in one embodiment, higher protocol layer 331 subscribes to particulars whose last three bits are 101 and 010 (even though the particular might be a thirty-two bit value), as these are the only particulars of interest to the higher protocol layer.

In one embodiment, the hashing function(s) used to hash values to produce the class and particular used in a destination address of a packet are selected to match the routing performed in a constrained network and/or size of filtering data structures available in lower-layer protocol layer 333.

Figure 4:
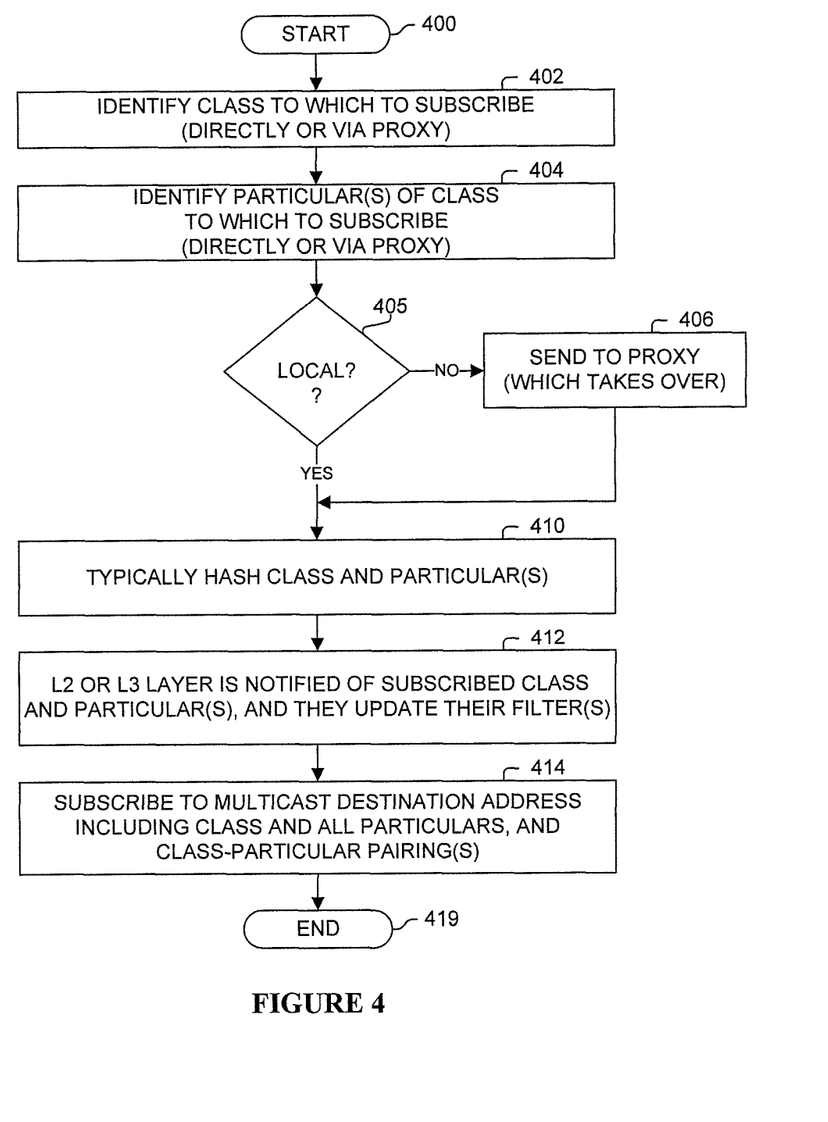
FIG. 4 illustrates a process according to one embodiment.

FIG. 4 illustrates a process performed in one embodiment. Processing begins with process block 400. In process block 402, a class is identified by a higher-layer protocol for which it desires to subscribe and receive packets (which could be directly or via a proxy in a network node). In process block 404, one or more particulars (e.g., single entities, all entities) of the class (identified in process block 402) is identified by a higher-layer protocol for which it desires to subscribe and receive packets (which could be directly or via a proxy in a network node). As determined in process block 405, if the filtering is to be performed by a remote proxy, then in process block 406, the class and particular are sent to the proxy, which performs the operations of process blocks 410-419.

Processing continues to process block 410, wherein the class and particular(s) are typically hashed to generate the class and particular values to be included in a destination address (e.g., multicast destination address). In process block 412, the class and particular(s) are registered (e.g., subscribed) with the lower-layer protocol layer (e.g., Layer-2 or Layer-3), which updates a data structure for filtering received packets. In process block 414, a multicast distribution group is subscribed to by the lower-layer protocol layer for the class and all particulars (e.g., where the particular is a wildcard matching all particulars) and for all registered class-particular pairings. Processing of the flow diagram of FIG. 4 is complete as indicated by process block 419.

Figure 5:
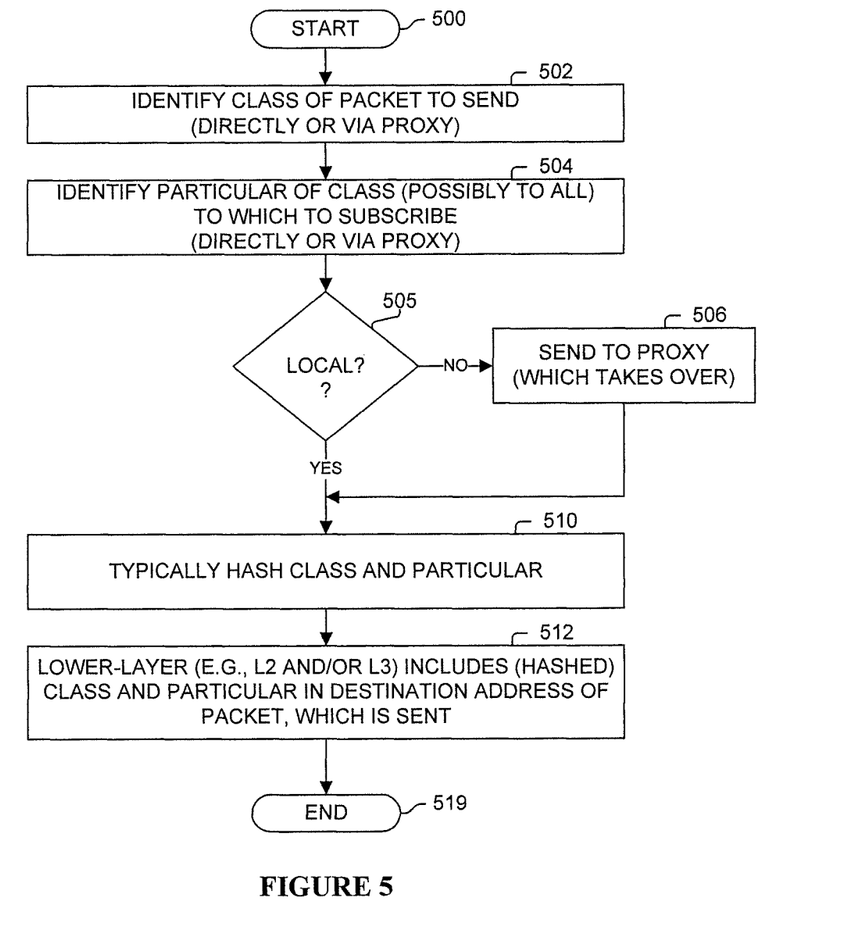
FIG. 5 illustrates a process according to one embodiment.

FIG. 5 illustrates a process performed in one embodiment for sending packet of a selected class and particular. Processing begins with process block 500. In process block 502, a class is identified. In process block 504, a particular is identified (e.g., a specific entity or all entities of the class). As determined in process block 505, if the sending of the packet is to be performed by a remote proxy, then in process block 506, the class and particular are sent to the proxy, which performs the operations of process blocks 510-519.

Processing continues to process block 510, wherein the class and particular(s) are typically hashed to generate the class and particular values to be included in a destination address (e.g., multicast destination address). In process block 512, the lower-layer protocol layer includes the (hashed) class and particular in the (multicast) destination address of the packet, which is sent from the network device. Processing of the flow diagram of FIG. 5 is complete as indicated by process block 519.

Figure 6:
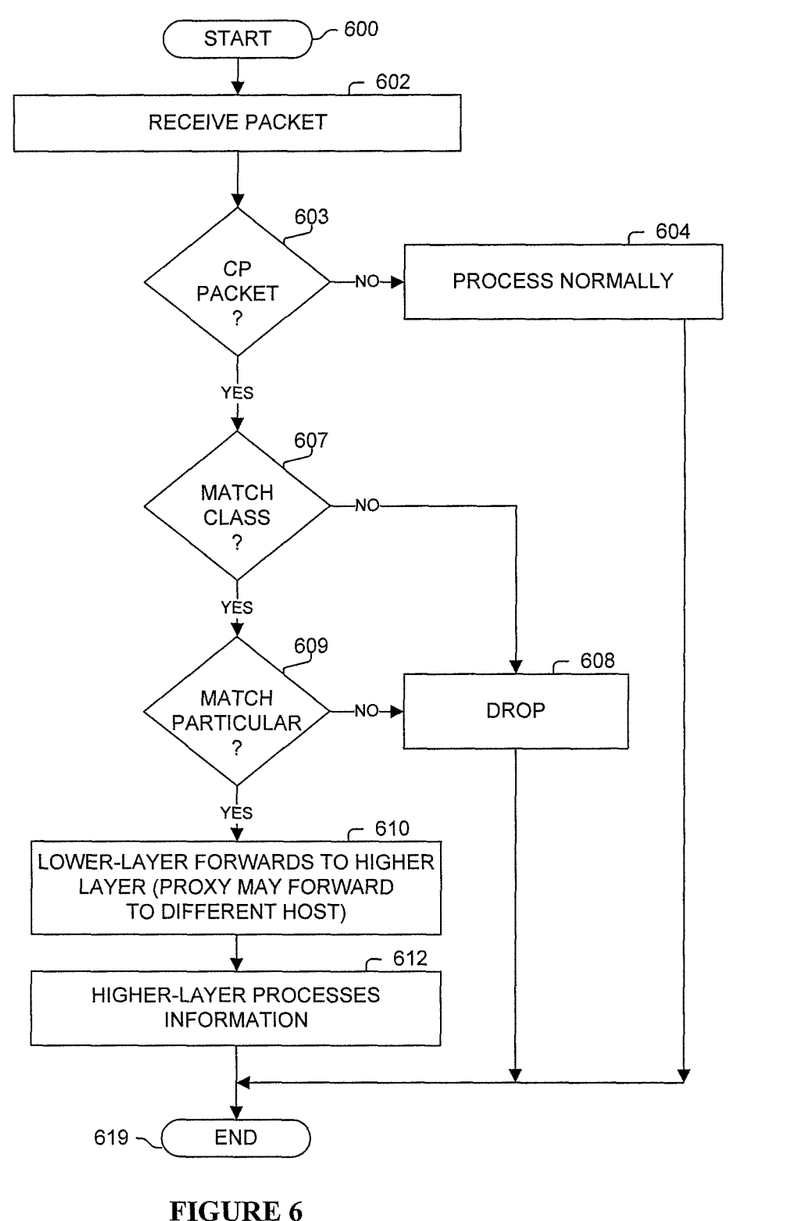
FIG. 6 illustrates a process according to one embodiment.

FIG. 6 illustrates a process performed in one embodiment by a network device receiving a packet. Processing begins with process block 600. In process block 602, a packet is received. If it is determined that it is not packet with a destination address including a class/particular in process block 603, then the packet is processed normally in process block 604. Otherwise, processing proceeds to process block 607.

As determined by the lower-layer protocol layer (e.g., Layer-2 or Layer-3), if the class portion of the received (multicast) destination address matches (e.g., exactly matches in one embodiment) as determined in process block 607 and the particular portion of the received (multicast) destination address matches (e.g., partially matches in one embodiment), then processing proceeds to process block 610. Otherwise, the packet is dropped (or otherwise processed) in process block 608.

In process block 610, the lower-layer protocol layer forwards information from the received packet (e.g., the lower-layer protocol is typically stripped), and in process block 612, the higher protocol layer processes this information.

Processing of the flow diagram of FIG. 6 is complete as indicated by process block 619.

Figure 7:
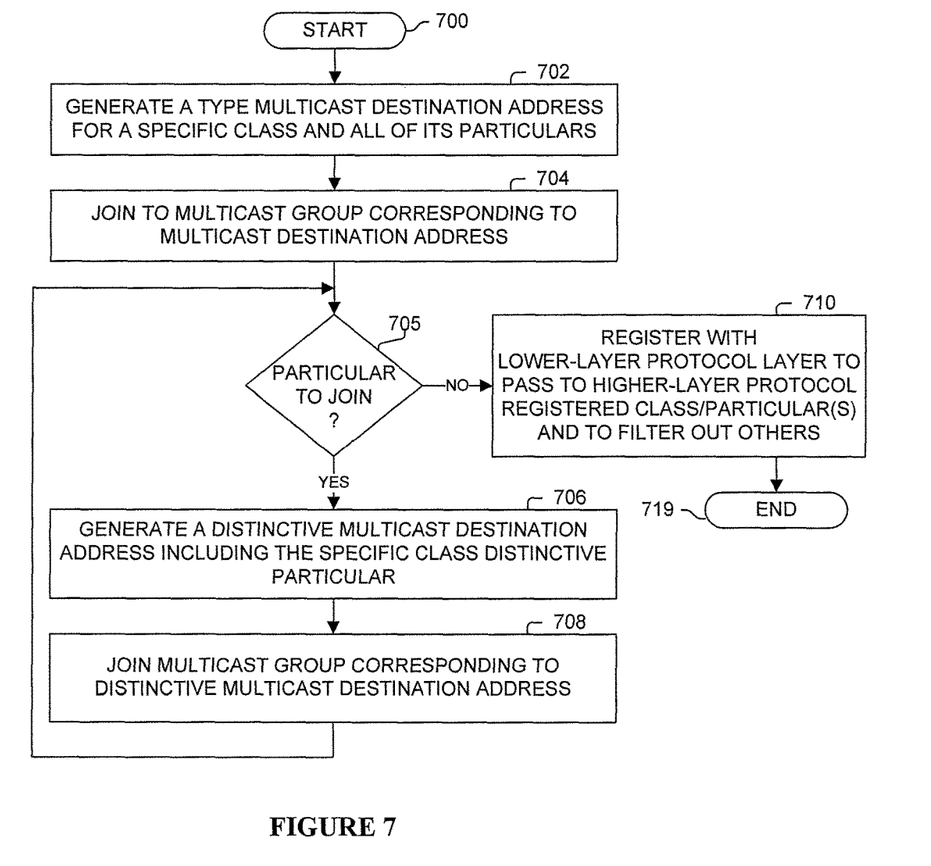
FIG. 7 illustrates a process according to one embodiment.

FIG. 7 illustrates a process performed in one embodiment by a network device. Processing begins with process block 700. In process block 702, a type multicast destination address is generated for a specific class and all particulars of the specific class. For example, the host wants to subscribe to an all "printers" group or "mDNS" group. In process block 704, the multicast group for the type multicast destination address is joined (e.g., one or more join packets are sent out).

While there is a particular multicast group to join, process blocks 706 and 708 are repeatedly performed. In process block 706, a multicast destination address for the class-particular pairing is generated, with the corresponding multicast group joined in process block 708.

When a multicast group for all particulars has been joined (if any), then in process block 710, the higher protocol layer registers with the lower-layer protocol layer to subscribe to the class/all particular and class/each particular pairings so at least some of the packets will be filtered by the lower-layer protocol. Processing of the flow diagram of FIG. 7 is complete as indicated by process block 719.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
a higher-layer protocol of a network device subscribing for both a class and a particular with a lower-layer protocol of the network device, to receive information from packets that have a destination address that includes both the class and the particular, with the destination address being a standard Layer 2 or Layer 3 multicast address, and with the particular being a subclass of the class;
receiving, by the network device from an external source, a specific packet containing a specific destination address of the specific packet, with the specific destination address being a standard Layer 2 or Layer 3 multicast address and consisting of the class, the particular, and one or more additional values; and
in response to the lower-layer protocol determining that the higher-layer protocol has subscribed for both the class and the particular and that the specific destination address includes both the class and the particular, forwarding information from the specific packet to the higher-layer protocol.

2. The method of claim 1, wherein said determining that the higher-layer protocol has subscribed to receive information includes performing an exact match on the class said registered against the class in the specific destination address, and performing a partial match on the particular said registered against the particular in the specific destination address.

3. The method of claim 1, wherein the network includes a constrained network; and wherein the specific packet is said received by the network device after having been transported over one or more nodes of the constrained network that forwarded the specific packet based on less than all of the bits in the destination address.

4. The method of claim 1, wherein the lower-layer protocol is a layer-2 or layer-3 protocol.

5. The method of claim 4, wherein the higher-layer protocol is an application layer protocol.

6. The method of claim 1, wherein one or both of the class and the particular in the destination address are protocol independent hashed values.

7. A network appliance, comprising:
one or more processing elements configured to perform operations;
memory; and
one or more of interfaces configured to send and receive packets;
wherein said operations, include:
a higher-layer protocol of the network appliance subscribing for both a class and a particular with a lower-layer protocol of the network appliance, to receive information from packets that have a destination address that includes both the class and the particular, with the destination address being a standard Layer 2 or Layer 3 multicast address, and with the particular being a subclass of the class;
receiving, by the network appliance in a network, a specific packet containing a specific destination address of the specific packet, with the destination address being a standard Layer 2 or Layer 3 multicast address and consisting of the class, the particular, and one or more additional values;
in response to the lower-layer protocol determining that the higher-layer protocol has subscribed for both the class and the particular and that the specific destination address includes both the class and the particular, forwarding information from the specific packet to the higher-layer protocol.

8. The network appliance of claim 7, wherein said determining that the higher-layer protocol has subscribed to receive information includes performing an exact match on the class against the specified class.

9. The network appliance of claim 7, wherein said determining that the higher-layer protocol has subscribed to receive information includes performing an exact match on the class said registered against the class in the specific destination address, and performing a partial match on the particular said registered against the particular in the specific destination address.

* * * * *